United States Patent [19]
Onodera et al.

[11] Patent Number: 5,694,829
[45] Date of Patent: Dec. 9, 1997

[54] PISTON AND PISTON PIN ARRANGEMENT FOR RECIPROCATING MACHINE

[75] Inventors: Akihito Onodera; Kazuo Miyazawa, both of Iwata, Japan

[73] Assignee: Yamaha Hatsudoki Kabushiki Kaisha, Iwata, Japan

[21] Appl. No.: 637,218

[22] Filed: Apr. 24, 1996

[30] Foreign Application Priority Data

| Apr. 25, 1995 | [JP] | Japan | 7-124254 |
| Nov. 7, 1995 | [JP] | Japan | 7-313496 |
| Jan. 17, 1996 | [JP] | Japan | 8-023201 |

[51] Int. Cl.⁶ .................... F01B 31/10
[52] U.S. Cl. .................... 92/157; 123/193.6; 123/41.38; 184/6.5
[58] Field of Search ............. 92/157, 187; 123/193.6, 123/41.37, 41.38; 184/6.5

[56] References Cited

U.S. PATENT DOCUMENTS

| 3,785,459 | 1/1974 | Patchen | 184/6.5 |
| 3,842,938 | 10/1974 | Barnes-Moss | 184/6.5 |
| 4,124,010 | 11/1978 | Fiedler | 123/193.6 |
| 4,189,932 | 2/1980 | Fiedler | 123/193.6 |
| 4,502,421 | 3/1985 | Perry | 123/41.37 |
| 4,796,517 | 1/1989 | Akao et al. | 92/187 |
| 5,174,249 | 12/1992 | Katou | 123/41.38 |

*Primary Examiner*—Thomas E. Denion
*Attorney, Agent, or Firm*—Knobbe, Martens, Olson & Bear LLP

[57] ABSTRACT

A number of embodiments of piston pin piston connections and lubricating arrangements for lubricating the piston pin. The piston pin connections are such so as to minimize localized wear on the piston. The lubricating arrangement is configured so as to deliver lubricant toward the piston pin and piston for cooling.

15 Claims, 19 Drawing Sheets

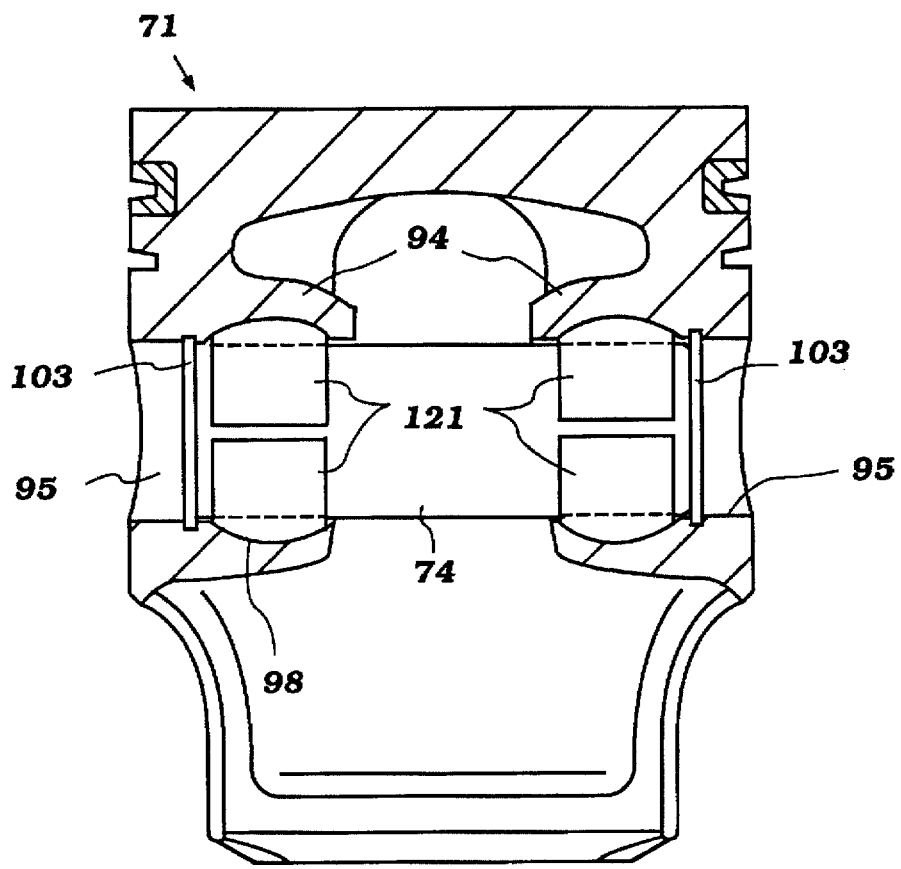
*Figure 14*
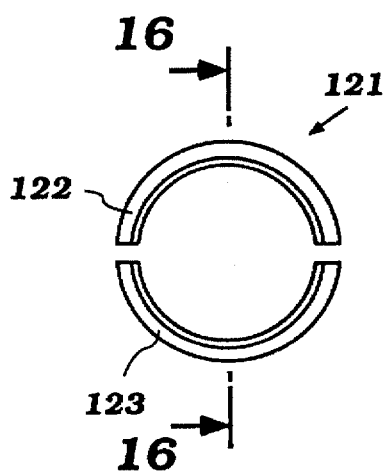 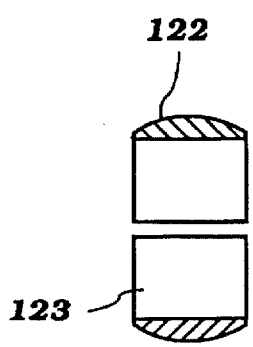 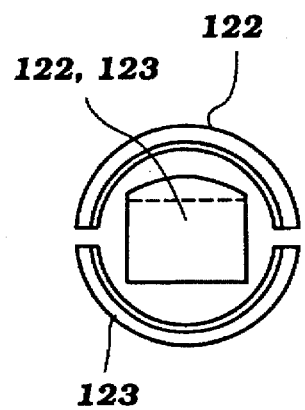
*Figure 15*   *Figure 16*   *Figure 17*

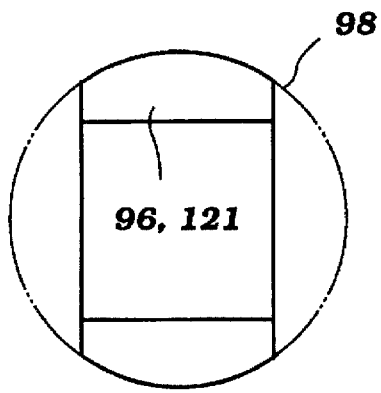
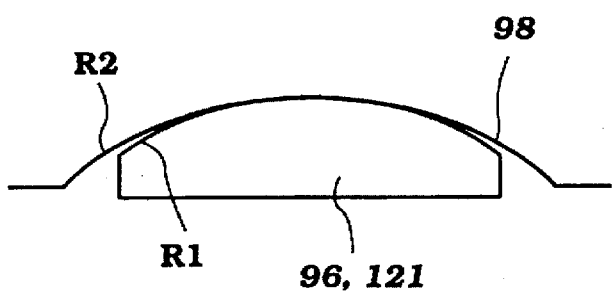
Figure 19              Figure 20
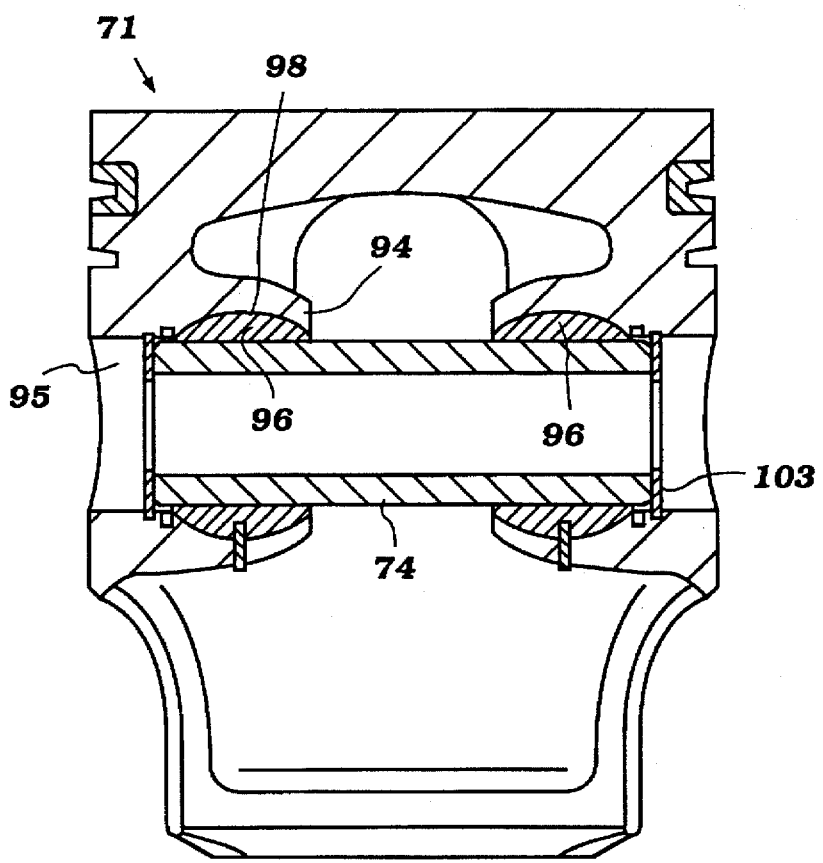
Figure 21

PISTON AND PISTON PIN ARRANGEMENT FOR RECIPROCATING MACHINE

BACKGROUND OF THE INVENTION

This invention relates to a piston and piston pin construction for a reciprocating machine and more particularly to that for an internal combustion engine.

As is well know in many types of reciprocating machines, the piston is provided with a pair of opposed piston pin bosses each of which has an opening that is adapted to receive a respective end of a piston pin. The area between the bosses on the piston pin journals a connecting rod so as to provide the connection between the piston and an associated crankshaft.

Although this type of connection is relatively simple, it does have certain problems which may be best understood by reference to FIGS. 1 through 4 which are views showing a conventional piston pin construction and explains the problems in connection with it. Referring first to FIGS. 1 and 2, these are cross-sectional views taken along a plane that contains the axis of a conventional prior art type of piston, indicated generally by the reference numeral 41. The plane of these cross-sectional views includes the axis 42 of a pair of piston pin receiving bores or recesses 43 formed in bosses 44 of the piston 41.

Conventionally, the piston 41 is formed from an aluminum or aluminum alloy so as to provide a lightweight construction. The skirt portion, particularly where the piston pin receiving bores 43 of the bosses 44 is tapered initially outwardly so that the head portion has a somewhat smaller effective diameter than the skirt portion. This tapering is indicated in exaggerated form in the figures, in order to illustrate more clearly the problem attendant with the prior art construction and make it evident to those skilled in the art how the invention solves these problems.

As may be seen in FIG. 2, when the piston 41 is fitted into a cylinder bore and operates at the normal operating temperature, the skirt portions will be compressed inwardly and the piston pin receiving bores 43 will be skewed so that the axis 42 no longer extends straight. Again, the mount of skewing is exaggerated in order to depict the problem and how the invention solves it more clearly.

This skewing of the axis 42 results in a condition at each of the bosses 44 as shown best in FIG. 3. In this figure, a piston pin 45 is shown in inserted condition in the piston pin receiving bores 43. As may be seen, the piston pin 45 tends not to deflect and as a result wear areas indicated by the arrow W will exist between the ends of the piston pin 45 and the interior surface of the piston receiving bores 43. In addition, a wear area will also exist at the inner end of the boss 44 where the piston surface defining the bore 43 tends to engage and scuff the piston pin 45 due to this skewing of the axis.

In addition and as shown in FIG. 4, the force exerted by the piston pin 45 to tend to resist this deformation actually causes the skirt portions and particularly the lower ends of the bosses 44 to deflect outwardly as shown by the broken line portion F of this view which causes the skirt of the piston to scuff the cylinder bore and create additional possible wear.

In addition to all of these problems with the prior art type construction, it should also be noted that the connecting rod, the small end of which appears in FIG. 5 and is identified by the reference numeral 46, experiences a cyclic loading on the piston pin 45 relative to the bosses 44 to cause it to deflect in one direction or the other. For example, when the piston 41 is being driven downwardly, the piston will create forces on the end of the piston pin 45 which are resisted by the connecting rod 46 and which will, cause deflection in the direction shown. However, under other conditions the force is in the opposite direction and hence wear may occur in both the areas W on the top and bottom thereof during the actual operation of the engine.

It is, therefore, a principal object of this invention to provide an improved journaling arrangement for journaling a piston pin in a piston so as to reduce wear and facilitates smooth operation.

It is a further object of this invention to provide an improved piston and piston pin arrangement for a reciprocating machine that will improve engine performance and reduce wear.

In addition to the problem of minimizing the effects of bending forces on the piston pin either caused by the deformation of the piston or the loading through the connecting rod, it is also important to ensure that the piston pin and connecting rod small end are adequately lubricated. This is a particular problem in conjunction with two cycle internal combustion engines.

With two cycle engines, it is the practice to lubricate major components of the engine by supplying lubricant into the engine through its induction system. This lubricant may either be sprayed into the induction system or delivered thereto in other manners. In addition, the lubricant which collects in the bottom of the crankcase chamber is frequently collected and returned back to the engine through the induction system. However, these systems generally rely upon the circulation of air or splash of lubricant in the crankcase chamber to achieve lubrication for the small end of the crankshaft. However, these systems do not truly ensure that lubricant will be delivered to the piston head and piston pin journals for their lubrication.

It is, therefore, a still further object-of this invention to provide an improved lubricating system for a two cycle engine.

It is yet another object of this invention to provide an improved lubricating system for a two cycle engine wherein the lubricant is positively delivered toward the piston pin.

It is yet a still further object of this invention to provide an engine lubricating system wherein lubricant is delivered directly to the head of the piston preferably under pressure.

SUMMARY OF THE INVENTION

A first feature of this invention is adapted to be embodied in a piston and piston pin arrangement for a reciprocating machine. The piston has a head portion and a skirt portion with a pair of spaced apart boss portions formed in the area of the skirt portion on opposite sides of the cylinder axis. Each of these boss portions is formed with a respective pin receiving recess. A piston pin has end portions received within the pin receiving recesses and spans the area between the bosses for attachment to the small end of a connecting rod. Means provide a bearing arrangement between the piston pin recesses and the ends of the piston pin for a accommodating flexure without creating high stress areas on the piston pin bosses.

Another feature of the invention is adapted to be embodied in a piston, piston pin, connecting rod and crankshaft arrangement for a reciprocating machine. The piston is provided with pin receiving bosses which receive the piston pin to provide a pivotal connection to the small end of the connecting rod. The big end of the connecting rod is journaled on a throw of the crankshaft. An oil delivery passage is formed in the crankshaft throw for delivering oil to a bearing area between the connecting rod big end and the throw. The connecting rod big end is formed with at least one aperture that is offset from a plane containing the axes of the throw and the piston pin and is disposed so as to register with the throw lubricating passage during at least a portion of the stroke of the piston adjacent its top dead center position for directing lubricant upwardly toward the piston pin.

BRIEF DESCRIPTION OF THE DRAWINGS

FIG. 6 is an enlarged cross-sectional view taken along the same plane as FIG. 1 but shows the crankshaft at a position immediately adjacent top dead center whereas FIG. 5 shows the condition at bottom dead center.

FIG. 14 is an enlarged cross-sectional view, in part similar to FIG. 8, and shows another embodiment of the invention.

FIG. 15 is an enlarged end elevational view of the spherical bearing halves of this embodiment.

FIG. 16 is a cross-sectional view taken along the line 16—16 of FIG. 15.

FIG. 17 is a view in part similar to FIG. 15 but shows how one of the bearing segments is rotated so as to facilitate installation into the piston pin receiving recess in this embodiment.

FIG. 19 is a partial cross-sectional view showing the relationship of the spherical outer diameter of the bearing for the piston pins relative to the piston pin receiving recesses.

FIG. 20 is a further enlarged view in part similar to FIG. 19 to illustrate another embodiment of the invention.

FIG. 21 is a cross-sectional view, in part similar to FIGS. 8 and 14 and shows yet another embodiment of the invention.

DETAILED DESCRIPTION OF THE PREFERRED EMBODIMENTS OF THE INVENTION

Figure 5:
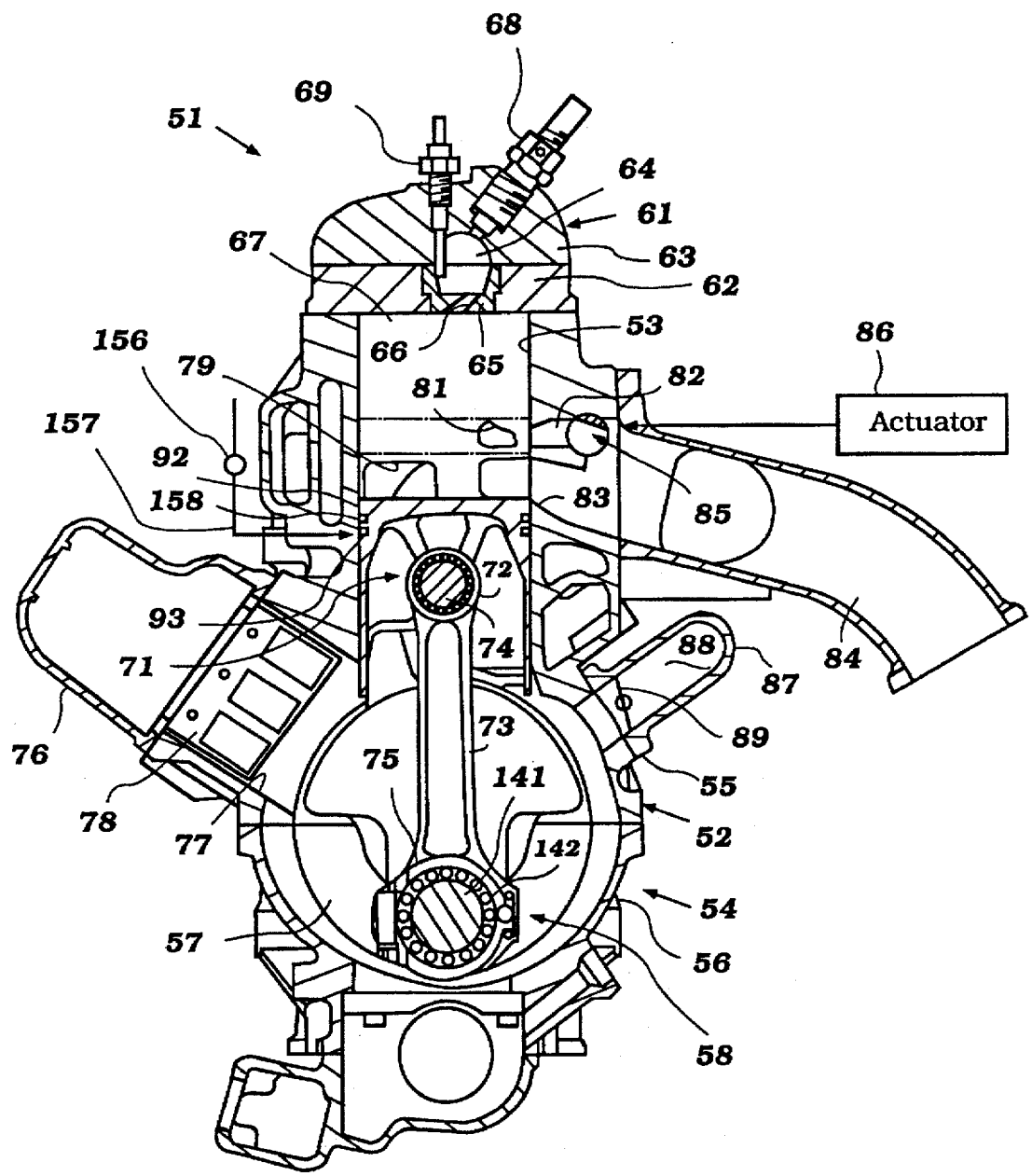
FIG. 5 is a cross-sectional view through a single cylinder of an engine constructed in accordance with an embodiment of the invention.
Figure 6:
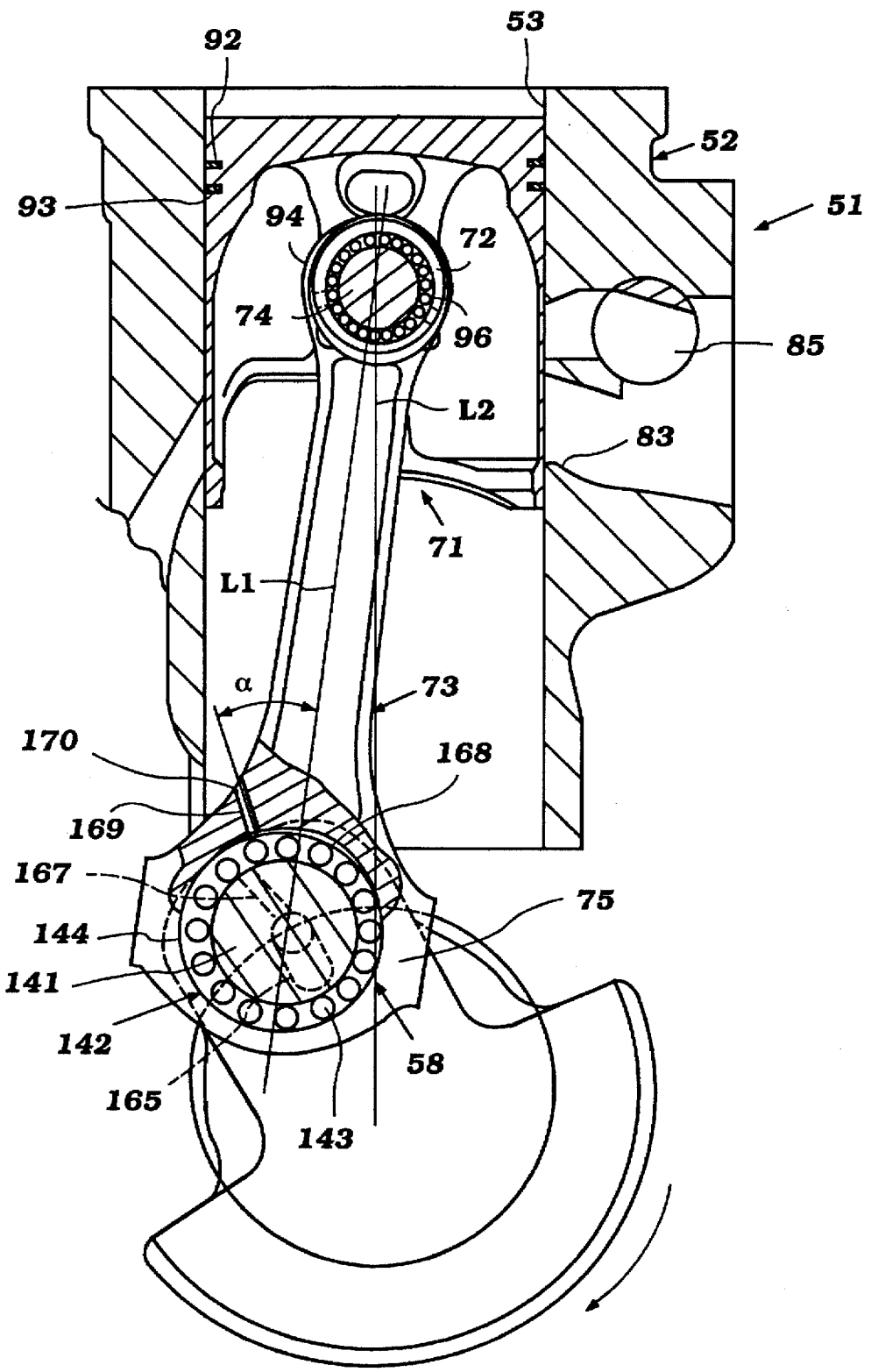
Figure 7:
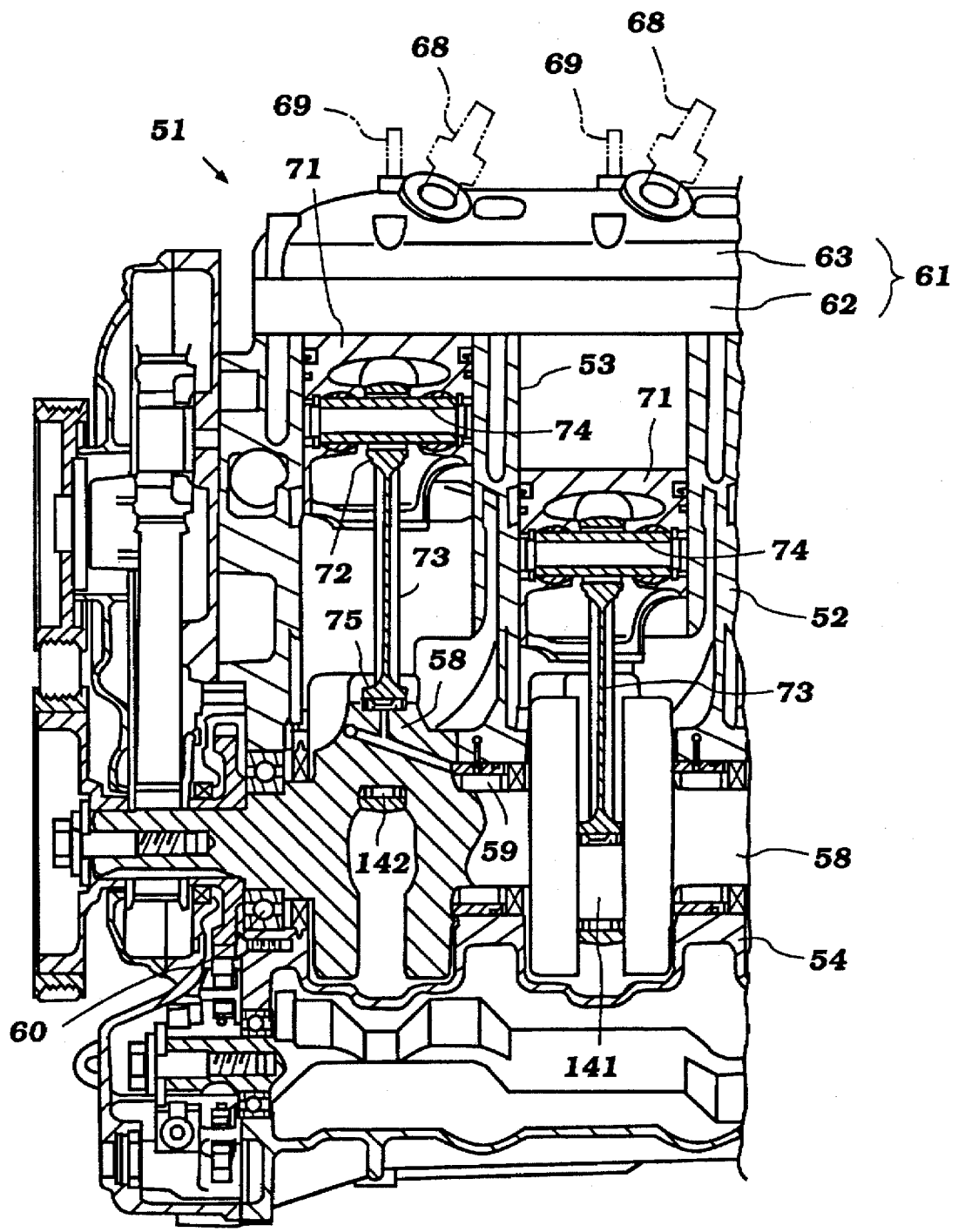
FIG. 7 is a partial view of the engine taken along a plane perpendicular to the axis of FIG. 1, with portions broken away so as to more clearly show the internal construction of the engine.

Referring initially primarily to FIGS. 5 through 7, a multi-cylinder, two cycle, crankcase compression, engine constructed in accordance with a first embodiment of the invention is identified generally by the reference numeral 51. In the illustrated embodiment, the engine 51 also operates on the diesel cycle. It will be apparent to those skilled in the art that the invention may also be utilized in spark ignited engines. A diesel engine is depicted, however, because the invention has particular utility in conjunction with such engines. This is because of the direct cylinder injection used with diesel engines normally which means that the underside of the piston is not cooled by evaporation in the crankcase chamber as with carbureted of manifold injected spark injected engines.

The engine 51 is comprised of a cylinder block 52 which is formed from a suitable material and which is formed with a plurality of cylinder bores 53. In the described embodiment, the engine 51 is a three-cylinder, in-line type but it will also be apparent to those skilled in the art how the invention can be utilized with engines having other cylinder numbers and other cylinder configuration.

The lower or crankshaft end of the engine 51 is formed with a crankcase assembly, indicated generally by the reference numeral 54 which is formed by a skirt 55 of the cylinder block and a crankcase member 56 that is affixed thereto in a known manner. This assembly forms a crankcase chamber 57. The crankcase chamber 57 is divided into individual chamber sections each associated with a respective one of the cylinder bores 53.

A crankshaft 58 is rotatably journaled in the crankcase chamber 57 by means of a plurality of main bearing assemblies, one of which appears in FIG. 7 and is identified generally by the reference numeral 59. In addition, end main bearings 60 are provided at opposite ends of the engine for further journaling the crankshaft 58.

A cylinder head assembly, indicated generally by the reference numeral 61 is affixed to the cylinder block 52 in any suitable manner. The cylinder head assembly 61 closes the ends of the cylinder bores 53 opposite to the crank case chamber 57. The cylinder head assembly 61 is formed by a lower portion 62 and an upper portion 63 which are connected to each other and to the cylinder block 52 in a suitable manner. The portions 63 and 62 define a precombustion or torch chamber 64 which is closed at its lower end by an insert piece 65. A throat 66 interconnects the precombustion chamber 64 with the main combustion chamber 67.

A fuel injector 68 is mounted in the cylinder head member 63 and sprays into the precombustion chamber 64. The charge will burn at the appropriate time when the pressure becomes high enough and exit through the throat 66 into the main chamber 67 where combustion continues. A glow plug 69 may also be mounted in the cylinder head assembly 61 and extend into the precombustion chamber 64 to initiate starting and to assist in continued running during warm up.

Pistons 71 are slidably supported in each of the cylinder bores 53 and are connected, in manner which will be described later, to the small ends 72 of connecting rods 73 by a means of piston pins 74. The lower or big ends 75 of the connecting rods 73 are journaled on the respective throws of the crankshaft 58 in a manner which will also be described later.

The engine 51 is provided with an air induction system for delivering an air charge to the crankcase chambers 57. This air induction system includes an air inlet device 76 that draws atmospheric air through an intake device of any known type. This intake device may also include a silencing and filtering assembly depending upon the application of use for the engine 51. This air inlet device 76 also includes a manifold that discharges the air charge to the crankcase chamber 57 through intake ports 77 formed in the skirt 55 of the cylinder block 52.

As is well known in this art, reed type check valves 78 are interposed in each of the intake ports 77 so as to permit an air charge to enter into the crankcase chambers 57 as the pistons 71 move upwardly toward top dead center. As the pistons move down to compress the charge in the crankcase chambers 57, the reed type valve 78 close to preclude reverse flow.

Figure 1:
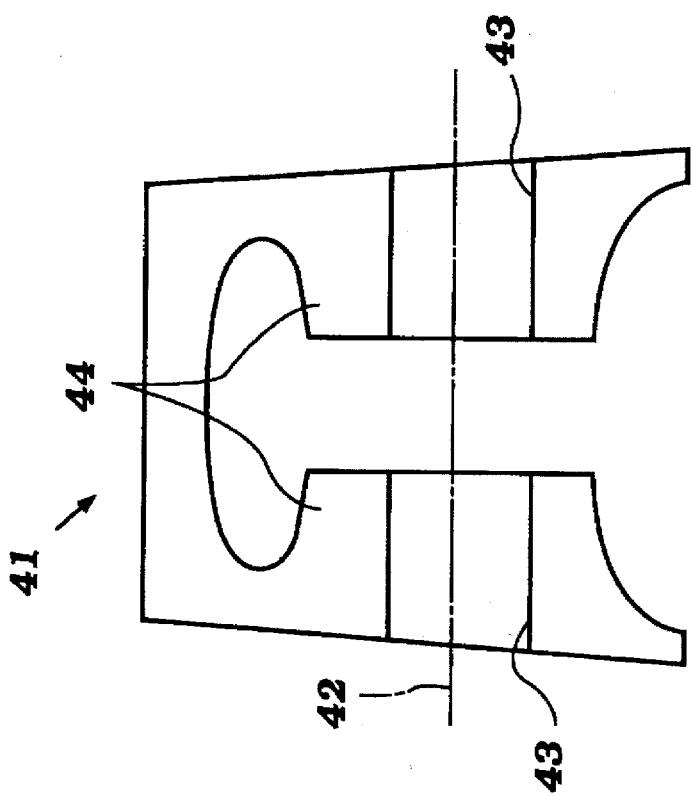
FIG. 1 is a cross-sectional view through the piston pin bosses of a piston constructed in accordance with a conventional prior art method.

The charge which is compressed in the crankcase chamber 57 is delivered to the combustion chamber 67 through suitable scavenge passage arrangements. In the illustrated embodiment, the engine 51 is provided with a pair of scavenge passages disposed on opposite sides of the plane through which the cross-section of FIG. 1 is taken. These scavenge passages terminate in scavenge ports 79 that open through the wall of the cylinder block 52 into the cylinder bores 53.

This charge is then further compressed in the combustion chambers 67 and the compressed charge also pressurizes the precombustion chamber 64. When the injector 68 injects fuel, the fuel will spontaneously ignite and expand as aforenoted so as to drive the pistons 71 downwardly and effect rotation of the crankshaft 58.

At an appropriate position in their downward movement, the pistons will pass an auxiliary exhaust port 81 that communicate with an auxiliary exhaust passage 82 formed in the cylinder block 52. Further downward movement will open a main exhaust passage 83 which merges with the auxiliary passages 82 and discharges into a common exhaust manifold 84.

The auxiliary exhaust passages 82 have associated with them an exhaust control valve 85 that is operated by an actuator 86 in accordance with a desired control strategy. Basically, the exhaust ports 81 are controlled so as to be open under high speed, high load conditions and under starting conditions so as to reduce the effective compression ratio and the heat generation under high speed and starting operations. However, the exhaust control valve 85 is closed at low and mid range running so as to increase the effective compression ratio and improve engine power output. Because the compression ratio can be lowered when operating under high speed high load conditions, performance increases throughout the entire engine operating range can be achieved.

There can be further provided a scavenge control system, indicated generally by the reference numeral 87 which is comprised of a scavenge manifold 88 and scavenge control valves 89. When the scavenge control valves 89 are closed, the crankcase chamber sections 57 associated with each of the cylinder bores 53 are sealed from each other and high scavenging flow will occur. When the scavenge control valves 89 are opened, however, the scavenging volume will be decreased because of the communication of the crankcase chambers operating in different cycles with each other so as to reduce the scavenging flow.

The construction of the engine 51 as thus far described may be considered to be conventional and, therefore, where any details of the engine 51 except those dealing with the piston pin, piston and connecting rod connection and lubrication therefor may be of any type known in the prior art. Therefore, reference may be had to any known prior art construction for details of the engine 51 except for those which will now be described and which relate initially to the connection between the piston 71, small end 72 of the connecting rod 73 and the lubrication therefor.

A first embodiment of piston and connecting rod construction will be described by particular reference to FIGS. 8 through 13. Like the prior art constructions, the pistons 71 formed in accordance with the invention each have a head portion 91 in which piston ring grooves 92 and 93 are formed. Beneath this head portion 91 is a skirt portion which includes piston pin bosses 94 that extend on opposite sides of the piston and which have piston ring receiving recesses 95 formed therein. The piston pins 74 extend through these recesses 95 but are journaled therein by a mechanism that accommodates the aforenoted deflection of either the piston pin 74 or the piston pin bosses and recesses 95, in a manner which will be described.

In accordance with an important feature of the invention, the diameter A of the piston recess 95 is not substantially equal to but is substantially larger than the diameter B of the outer surface of the piston pin 74. This provides a clearance D therebetween. This clearance is adequate so that any skewing of the axis of the recess 95 will not cause contact between the boss 94 and the piston pin 74.

This clearance is maintained by a spherical bearing assembly 96 which may be formed from any suitable type of bearing material and which has an inner diameter 97 that is substantially complementary to and receives the outer diameter B of the piston pin 74. This spherical bearing 96 is received within a bearing recess 98 formed around the recess 95 of the boss 94 and which has a greater effective diameter than the recess 95.

Figure 8:
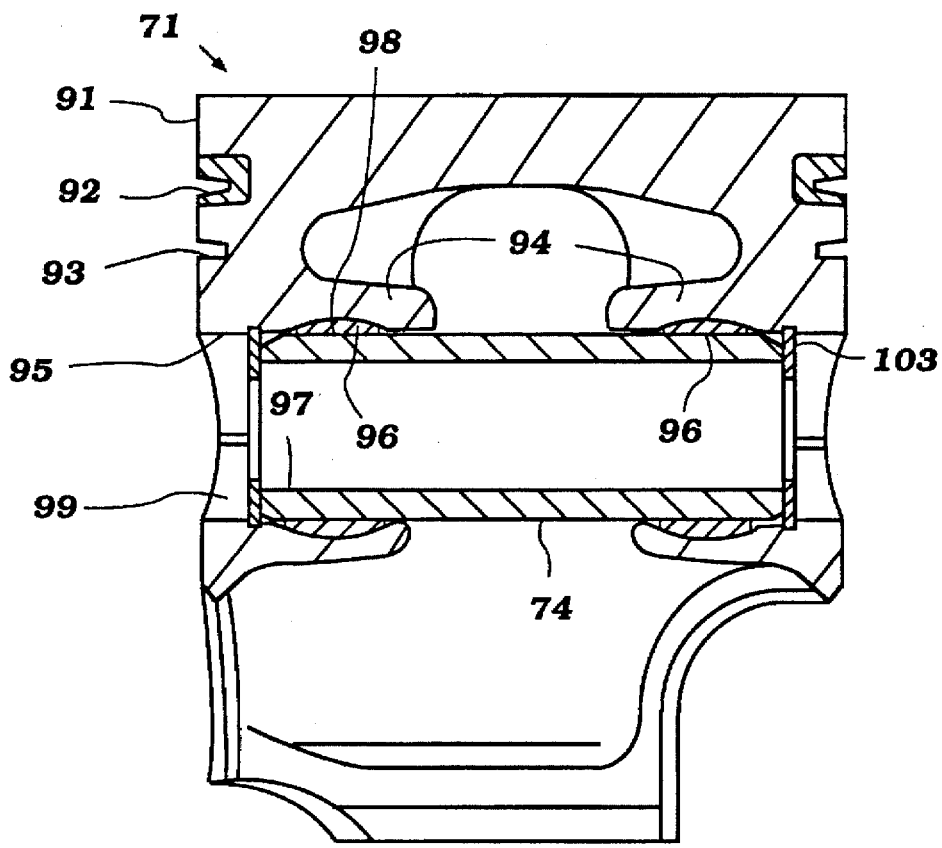
FIG. 8 is an enlarged cross-sectional view, in part similar to FIG. 4, but shows the piston pin connection to the piston and connecting rod in accordance with an embodiment of the invention.
Figure 9:
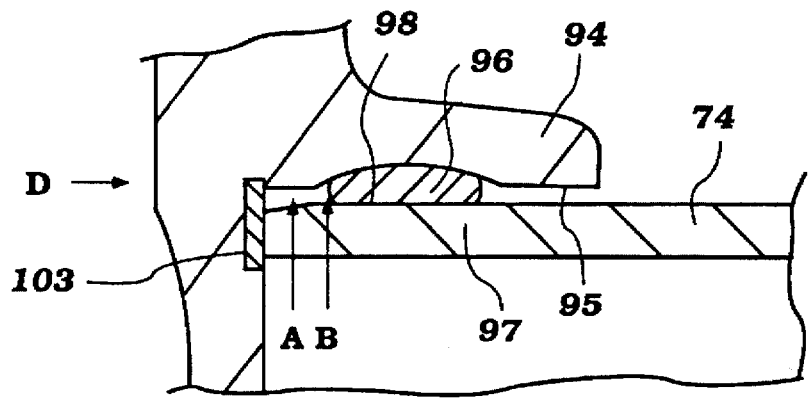
FIG. 9 is a further enlarged cross-sectional view in the area showing one of the ends of the piston pin.
Figure 11:
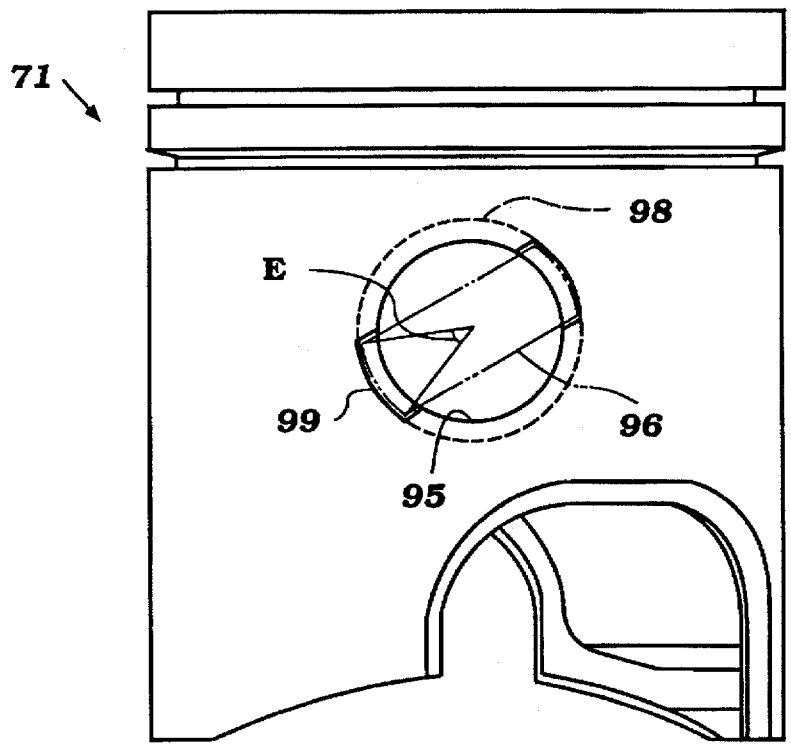
FIG. 11 is a side elevational view of the piston and piston pin and shows how the bearing arrangement can be installed in this embodiment.

In order to facilitate the insertion of the bearing 96, the piston pin bosses 94 are provided with a slotted recess 99 as best seen in FIGS. 8 and 11 and which is disposed at an angle as best seen in FIG. 7 so that the axial sides of the piston pin will be free of this weakened area as will be the radial sides perpendicularly to the axial direction. Thus, the width of this recess is equal to an arc indicated at E in FIG. 7 which is preferably less than 90° and the size of which is dictated by the axial length of the spherical bearings 96. Thus, the bearings 96 may be rotated to a position as shown in phantom line in FIG. 7, inserted into the recesses 99 until they mate with the boss recesses 98 and then rotated into their final positions.

Figure 10:
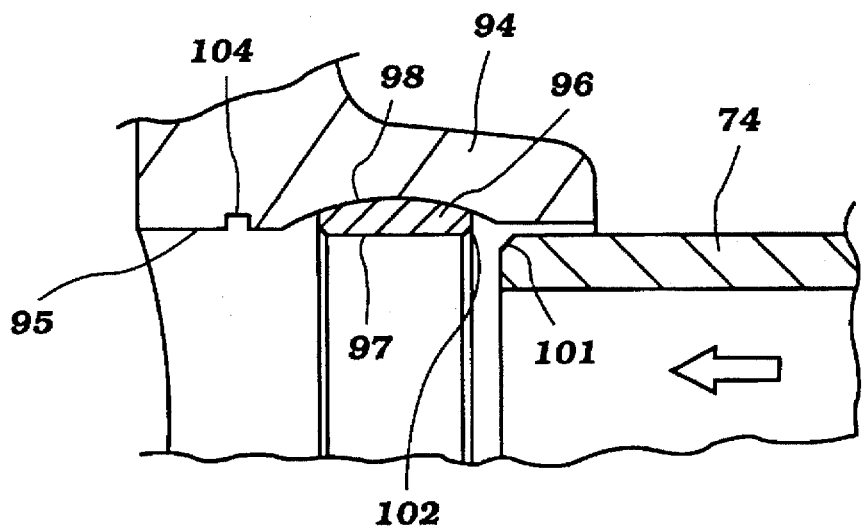
FIG. 10 is an enlarged cross-sectional view, in part similar to FIG. 9 and shows the installation of the piston pin.

To facilitate insertion of the piston pin 74, the ends of the piston pins 74 are provided with reliefs or chamfers 101 and chamfers 102 are provided at opposite ends of the bearing bore 97 so as to permit the pin 74 to be inserted as shown by the arrow in FIG. 10.

When the pin 74 is in place, snap rings 103 are inserted in snap ring receiving grooves 104 formed in the bosses 94 at the outer ends of the recesses 95. Hence, the pins 74 are held against axial movement. These snap ring receiving grooves are stress risers in conventional constructions. This is because of the axial forces exerted in conventional constructions caused by the bending effects. These are eliminated in accordance with the invention and thus this possibility of cracking is substantially eliminated for reasons which should become apparent.

Figure 4:
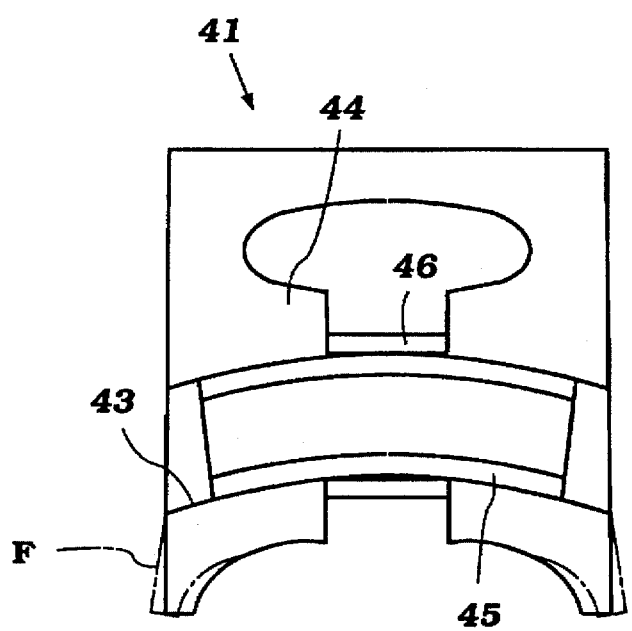
FIG. 4 is a cross-sectional view, in part similar to FIGS. 1 through 3 and shows how the skewing of the piston pin receiving bores of the bosses causes deflection of the piston that can result in scuffing action.
Figure 13:
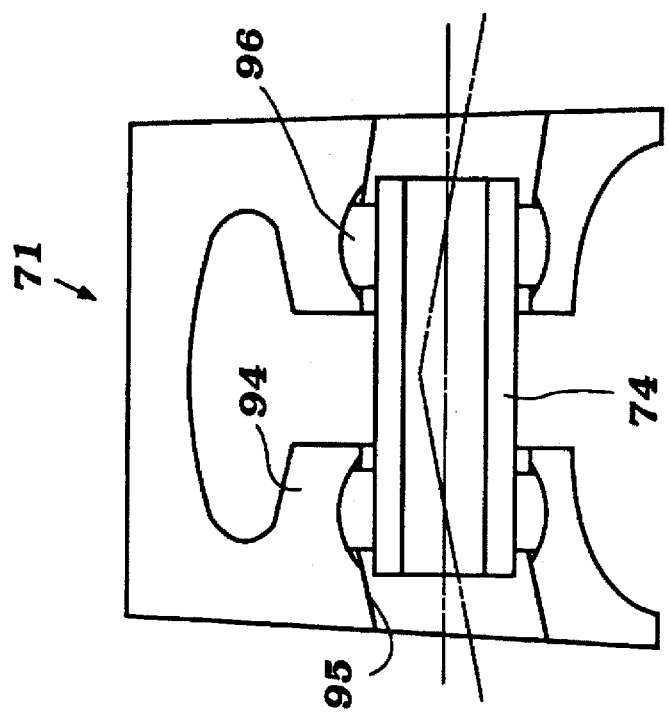
FIG. 13 is a cross-sectional view, in part similar to FIGS. 2 and 4 and shows how this embodiment avoids stresses and wear.
Figure 12:
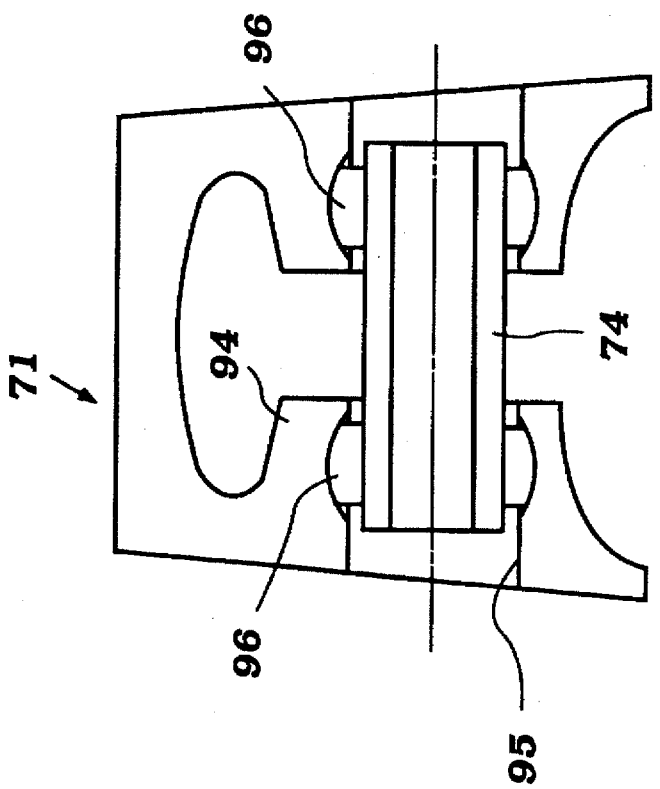
FIG. 12 is a cross-sectional view, in part similar to FIG. 1 but shows the piston pin in place in accordance with the first embodiment of the invention.

FIG. 12 is a view which corresponds generally to FIG. 1 and shows the initial shape of the piston 71 with the pin 74 in place. Because of the spherical bearings 96, when the piston skirt is deformed by heat and fitting in the cylinder bore 53, its position and shape will be as shown in FIG. 13. Although the axes of the recesses 95 become skewed, the bearings will accommodate this movement without putting any stresses on the piston pin 74. Also no axial loading is placed on the piston 71 through the snap rings 103. These snap rings can be easily inserted through the groves 99. In a like manner, the piston pin 74 will not put reverse force on the piston skirt causing it to deflect as shown in FIG. 4 with the prior art type of construction.

Because of the fact that the slot or recess 99 for inserting the bearings 96 is offset as it is, there will not be substantial weakening of the piston. However, FIGS. 14–18 show another embodiment of the invention wherein the recesses 99 can be totally eliminated. Except for this construction and the construction of the bearing, indicated by the reference numeral 121, the construction of the piston 71 and the piston pin bosses 94 and piston pin receiving recesses 95 is the same and those parts have been identified by the same reference numerals and will not be described again. In addition, the piston pin 74 can have the same general type of construction.

In this embodiment, the spherical bearings 121 are actually comprised of a pair of bearing segments, indicated in FIGS. 15–17 by the reference numerals 122 and 123. These two bearing segments 122 and 123 have a circumferential extent which is slightly less than the 360°. As a result, the segments 122 and 123 may be rotated to a position 90° from their normal position, as seen in FIG. 17, for insertion without utilizing or requiring a slot as the slot 99 in the previous embodiment. In this position, the total diameter or diametral height of the bearing segments 122 and 123 is less than that of the recess 95 and hence, they can be inserted without having such additional slots. This insertion process will be described now by reference to FIG. 18.

Figure 2:
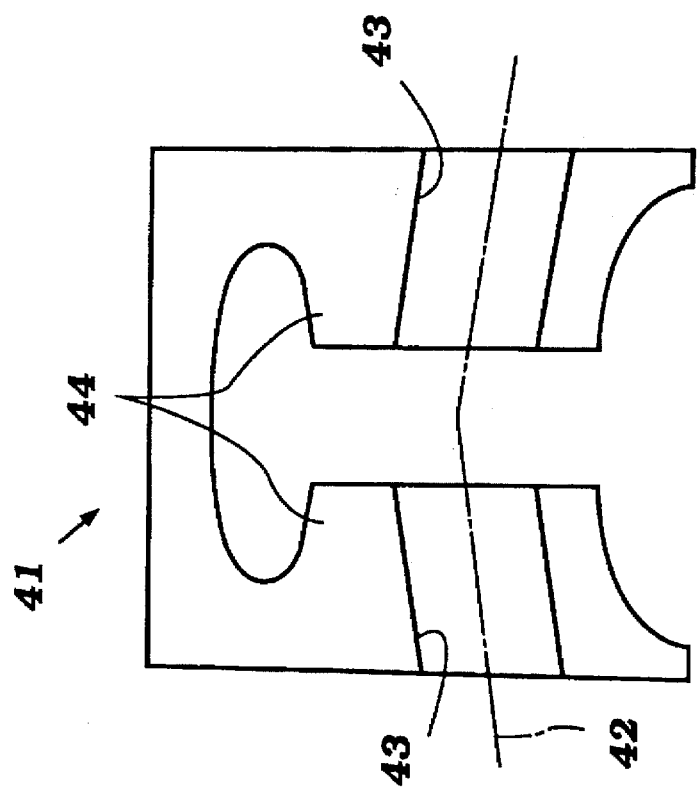
FIG. 2 is a cross-sectional view, in part similar to FIG. 1 and shows the condition when the piston is received in a cylinder bore and is at operating temperature.
Figure 3:
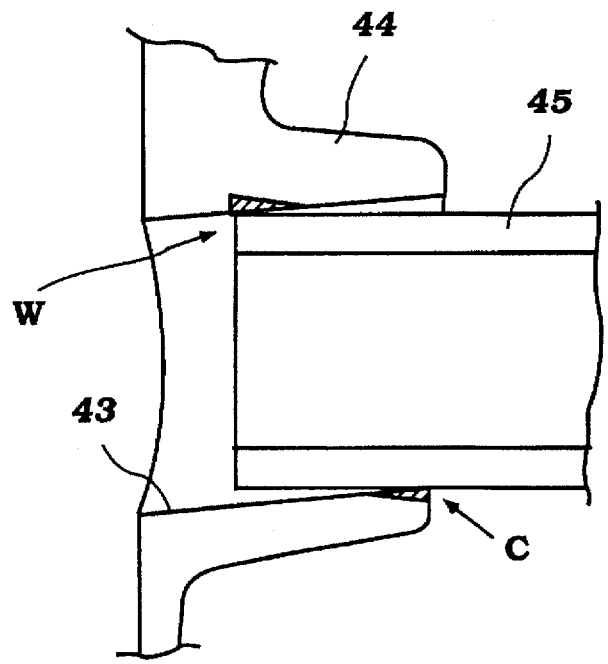
FIG. 3 is an enlarged cross-sectional view showing the piston wear areas that result from the condition shown in FIG. 2.
Figure 18:
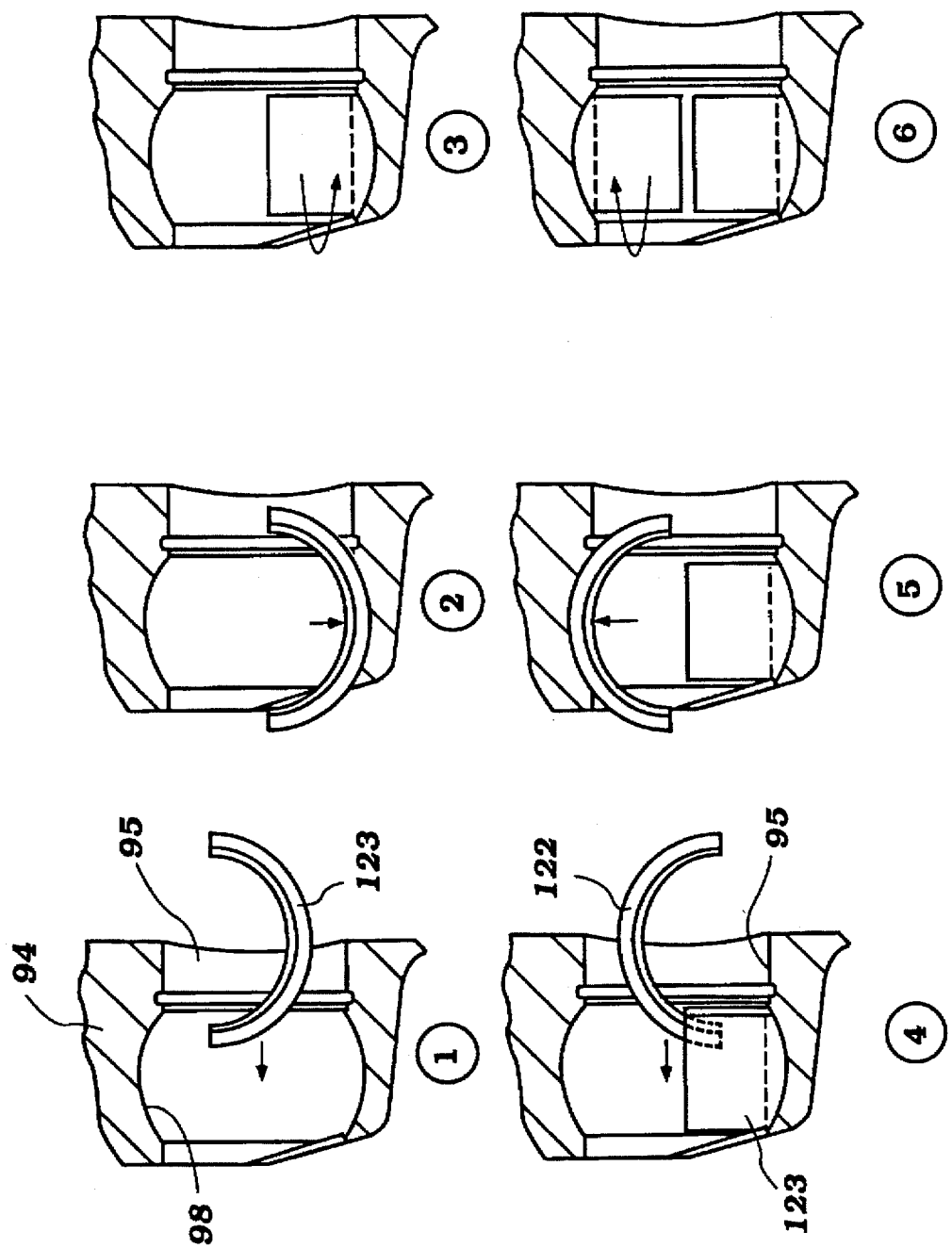
FIG. 18 is a six-part view showing the installation steps of the bearing segments of this embodiment.

As seen in FIG. 18, the lower bearing half 123 is rotated so that its bearing surface extends transversely to its final position so that it can be inserted into an open end of the boss recess 95. Upon becoming axially aligned with the piston bearing receiving recess 98, as seen in FIG. 18-2, the bearing segment 123 is placed into engagement with the lower surface and then rotated through 90°, as seen in FIG. 3, so that it will be in its final position.

The bearing half 122 is then rotated through 90° to the position shown in FIG. 18-4, and is then inserted axially into the piston recess 95. When aligned with the bearing receiving recess 98 as shown in FIG. 5, the bearing segment 122 is moved into engagement with this surface and then rotated through 90° to the position shown in FIG. 18-6. The piston pin 74 can then be installed.

In the embodiments as thus far described, the outer surface of the bearings 96 or 121 have had a spherical radius equivalent to that of the corresponding mating piston recess 98. However, because of the dissimilar coefficients of thermal expansion, this may cause some binding. Therefore, in accordance with another embodiment of the invention, which can be practiced with any of those previously described, the spherical radius R1 of the bearings 96 or 121 may be made smaller than the radius R2 of the piston bearing receiving recesses 98. Then, when the bearing surfaces expand, there will be less likelihood of binding between the bearings 96 and 121 and the respective recesses 98.

Figure 22:
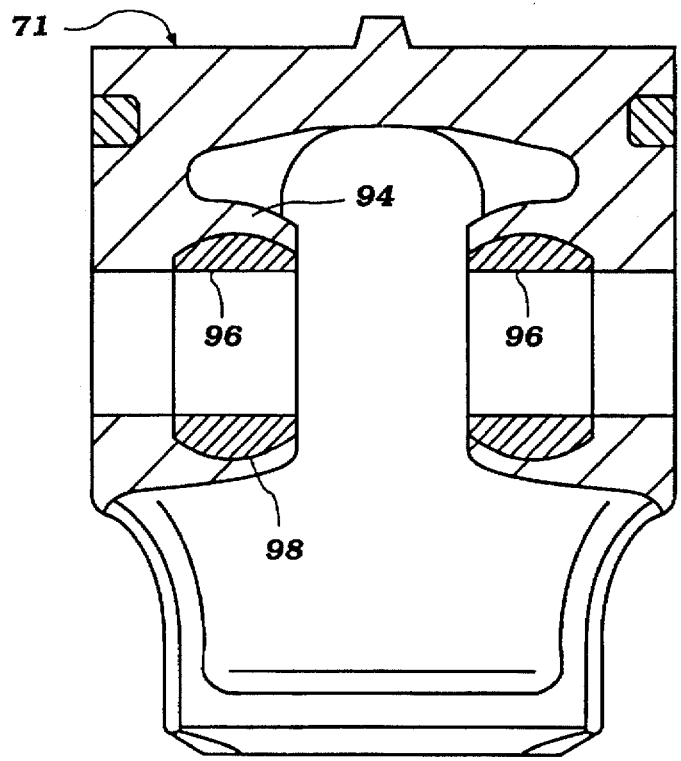
FIG. 22 is a cross-sectional view of this embodiment showing the configuration of the piston after it is cast and before the piston pin is put in place and before the cast piston is machined.
Figure 23:
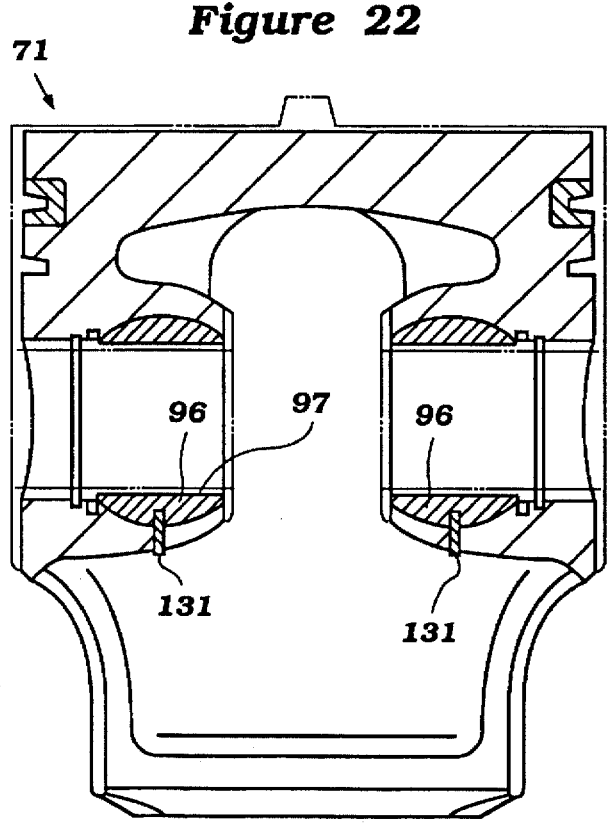
FIG. 23 is a cross-sectional view, in part similar to FIG. 22 and shows the finish machined piston.
Figure 24:
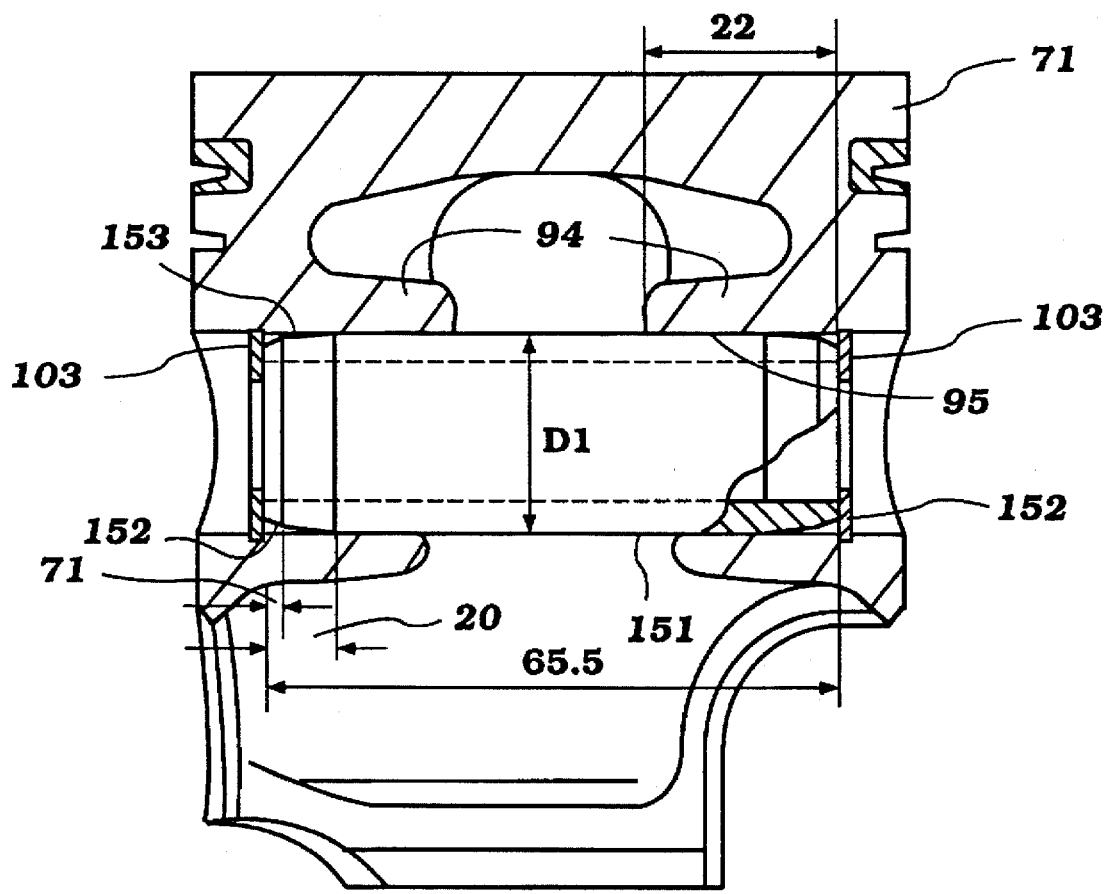
FIG. 24 is a cross-sectional view, in part similar to FIGS. 8, 14 and 21 and shows yet another embodiment of the invention.

FIGS. 21–23 illustrate another embodiment of the invention. This is an embodiment where a single piece bearing, such as the bearings 96 of the previously described embodiments, may be employed. In this embodiment, however, the bearings 96 are cast in place with the piston 71 when it is cast. This eliminates the necessity of machining the recesses 98 for the bearings in the piston pin bosses 94.

The way this embodiment is manufactured is that the bearings 96 are held in a fixture when the piston 71 is cast. If desired, the surface of the spherical portion can be treated by nitride and/or a parting agent, such as oil, may be placed on the bearing before casting. The finished casting is formed as seen in FIG. 22.

Then, small holes are drilled through the sides of the piston pin bosses 94 to receive pins 131 which will hold the bearings 96 against rotation during the machining of their bores 97. In this embodiment, the bearings 96 are placed at the inner ends of the bosses 94 and hence, a machining operation is only necessary at the outer end to provide clearance and to form the grooves 104 to receive the snap rings. These pins 131 are later removed.

In each of the embodiments as thus far described, either unitary or split spherical bearings have been employed. FIG.

24 shows another embodiment where the use of such separate bearings can be eliminated, and the localized wear prevented by the formation of the piston pin, indicated generally by the reference numeral 151 in this embodiment. In this embodiment, the configuration of the piston 71 is the same as that previously described and, therefore, the piston and its components have been identified by the same reference numerals. It will be seen that the piston pin boss recesses 95 are formed of a diameter, indicated by the dimension D1, which is substantially the same, except for clearance, as the outer diameter of the piston pin 151 throughout the major portion of its length.

The piston pin 151 is, however, provided with a taper at its ends, which taper is designed so as to achieve the bearing surface that will reduce the localized wear. For this purpose, each end of the piston pin 151 is formed with a first tapered portion 152, which tapered portion 152 is relatively steeply tapered relative to the next tapered section so as to facilitate insertion and to provide a maximum clearance. This taper 152 is still relatively shallow such as a taper of $1/1000$. This taper 152 is relatively short in length and merges into a taper 153 that extends for a substantially greater length. This other taper 153 is less steep, such as $1/3000$. The second taper 153 is also much longer.

In a specific embodiment, the total length between the retaining snap rings 103 and the end of each boss 94 is approximately 22 millimeters, while the total distance between the snap rings is 65.5 millimeters. From the outer ends, the first tapers 152 extend for a length of about 5 millimeters, and the total tapered length is 20 millimeters. Thus, the tapered sections 153 extend for about 15 millimeters. This tapering is such to provide clearance at the ends of the pistons so that if there is deformation, there is less likely to be localized contact and the wear problems attendant with the conventional prior art structures are avoided.

The lubrication system for the engine, and specifically but not limited to the lubrication for the connection between the piston pins and the pistons, will now be described. This lubrication system will be described initially by reference to an embodiment which may be best understood by reference to FIGS. 5–7 and FIG. 25.

As may be seen, the bearing between the connecting rod big end 75 and the throws of the crankshaft 58, which throws are indicated by the reference numeral 141, is provided by a needle-type bearing assembly, indicated generally by the reference numeral 142. This bearing assembly 142 is comprised of a plurality of needles 143 that are held in spaced relationship by a cage 144. The needles 143 cooperate with the surfaces of the throw 141 and connecting rod big end 75 so as to provide an antifriction support therefor in a well known manner.

Figure 25:
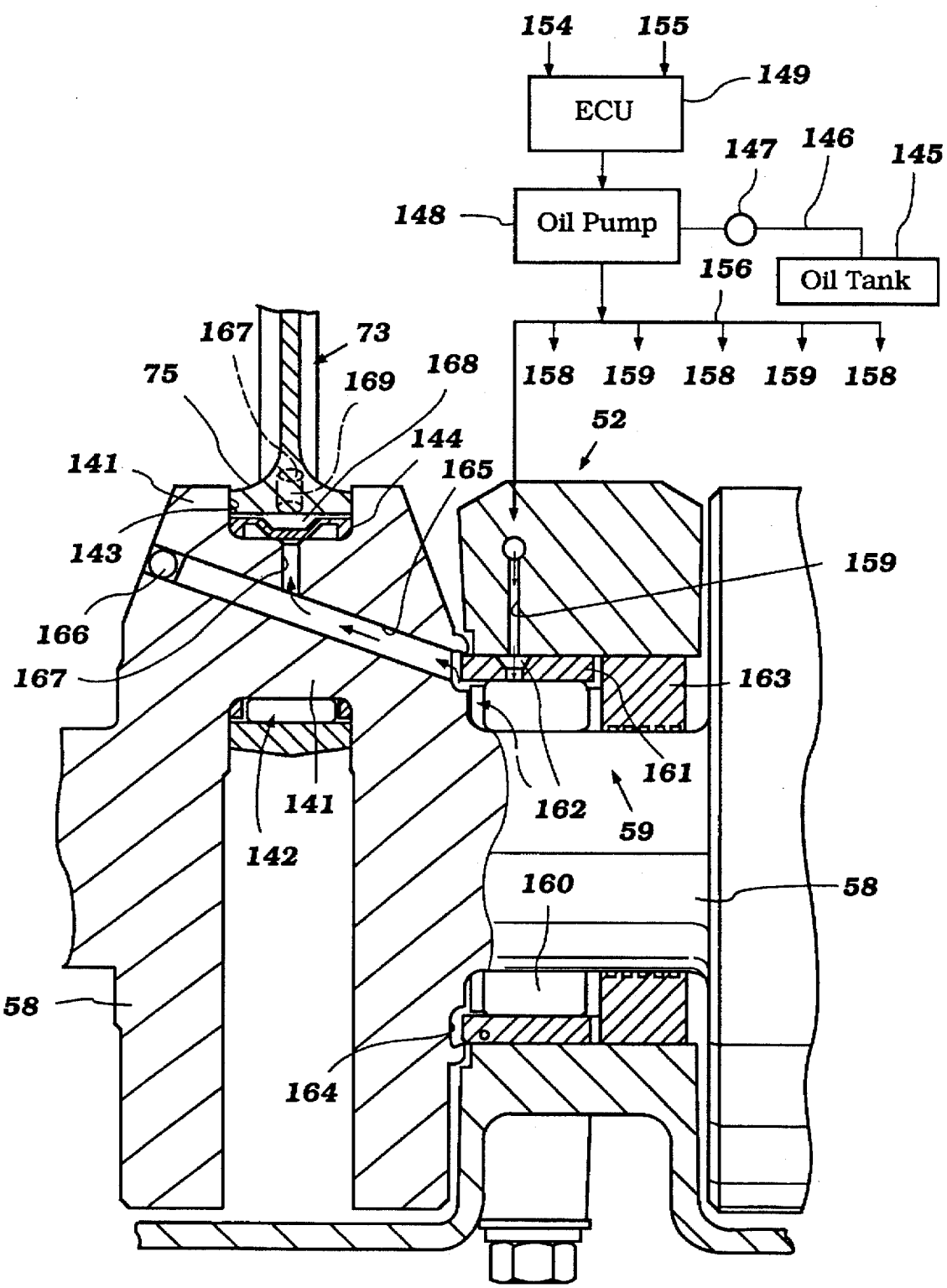
FIG. 25 is an enlarged cross-sectional view taken along a plane perpendicular to the plane of FIG. 6 and shows how the lubricant is delivered to the big connecting rod ends in accordance with a further embodiment of the invention including a schematic illustration of some of the components of the lubricating system.

The total oil system for the engine is shown partially schematically in FIG. 25, and it includes a lubricant tank 145 that is located in a convenient location and which delivers lubricant through a conduit 146 in which a filter 147 is provided to a metering pump 148. The metering pump 148 may be of any type that controls the amount of lubricant in response to various engine conditions. This pump 148 is controlled by a control 149 that receives input signals indicative of engine running conditions, such as an engine speed signal 154 and a load signal 155, from appropriate sensors.

The lubricant pump 148 delivers lubricant to the cylinder bores 53 and the engaging surfaces and components through a manifold system 156 through a first series of cylinder bore lubricating passages 157. These passages 157 may, if desired, have a separate gallery and discharge. These passages 157 discharge, as shown in FIG. 5, through the cylinder block 52 through individual spray ports 158. These passages 158 intersect the cylinder bore 53 in an area so as to be swept by the skirt of the pistons 71 and in proximity to the lower piston ring grooves 93 when the pistons 71 are at their bottom dead-center position, as shown in FIG. 5.

The oil pump 148 also delivers oil through a gallery and passages 159 to the main bearing assemblies 59. As may be best seen in FIG. 25, each main bearing 59 includes individual roller bearings or needles 160 that are held in position by a caging member 161. The caging member 161 is intersected by the main bearing oil delivery grooves 159 and has a passageway 162 that permits lubricant to flow into this area for lubrication of the bearings 160.

It should be noted that one end of this arrangement is closed by a seal 163 which is part of the sealing between adjacent crankcase chambers. In addition, the adjacent cheek of the crankshaft 58 is provided with a recess 164 into which a portion of the caging member 161 extends. Hence, lubricant that flows into the bearing 59 will be channeled into the recess 164 and little will escape elsewhere.

This recess 164 is intersected by a connecting rod bearing lubricating passage 165 that is drilled through the crankshaft throw and which has its outer end closed by a plug 166. A radially extending passageway 167 in the throw 141 intersects the cross-drilling 165 and cooperates with a groove in which the connecting rod bearing assemblies 142 are positioned. This passageway 167 opens in a space between the bearings so that lubricant may flow to an oil receiving channel 168 formed in the inner surface of the connecting rod big end 75. As may be seen in FIG. 27, this channel receives oil under some but not all angular positions of the crankshaft 58. The ends of the connecting rod big end are spaced closely from the sides of the receiving groove of the crankshaft 58 so as to minimize all leakage back to the crankcase. Also, the size of the oil delivery passages is substantially greater than this clearance, and hence, the oil will tend to flow through the passages rather than escape.

In addition to lubricating the connecting rod big end bearings 142, this oil is also used to spray toward the piston pins 74 and lubricate them. In addition, this lubricant will be swept toward the head of the piston to provide internal cooling for it.

Figure 26:
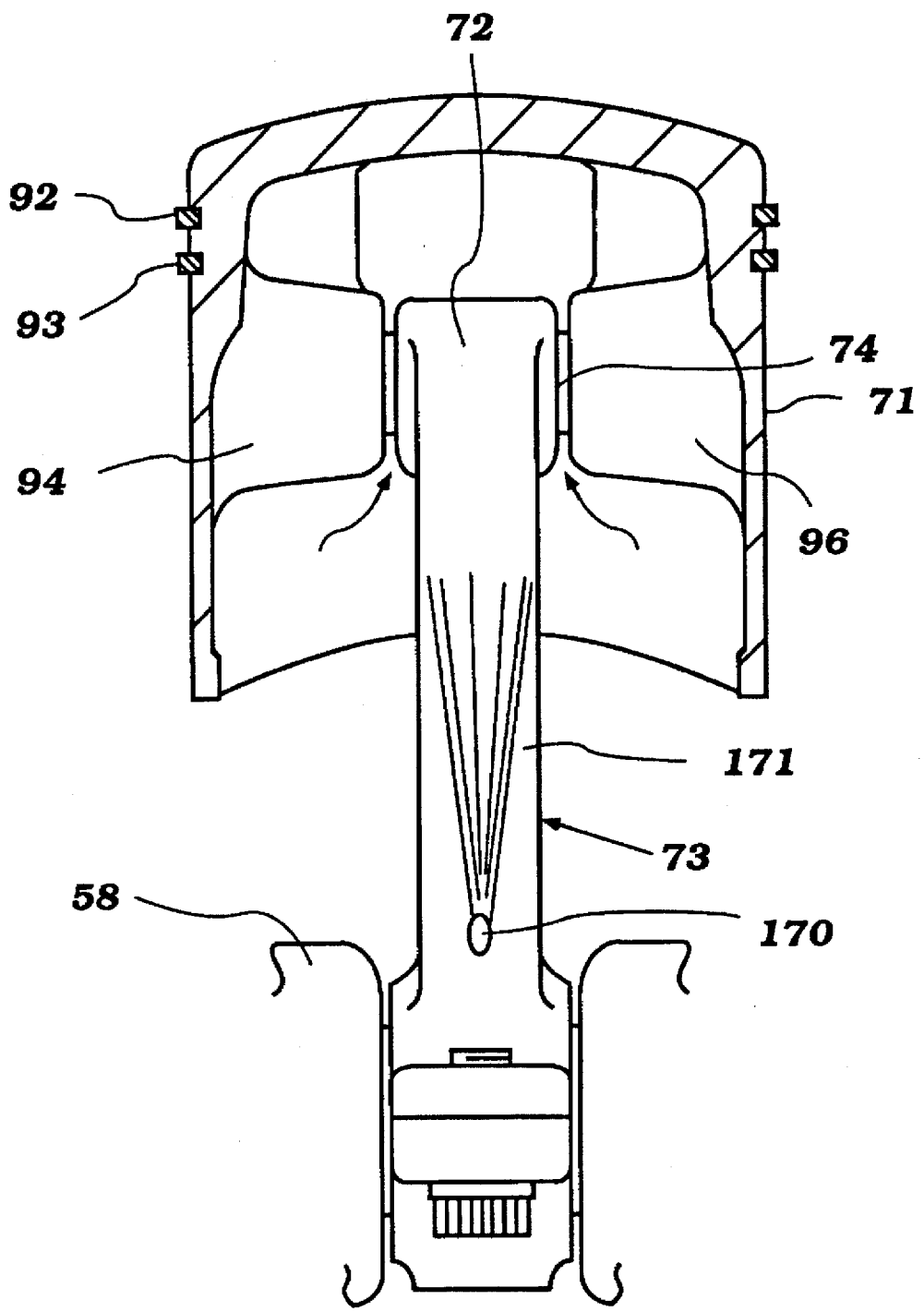
FIG. 26 is a side elevational view looking in the same direction as FIG. 25 and shows how the lubricant is directed toward to the piston pin and piston head in this embodiment.
Figure 27:
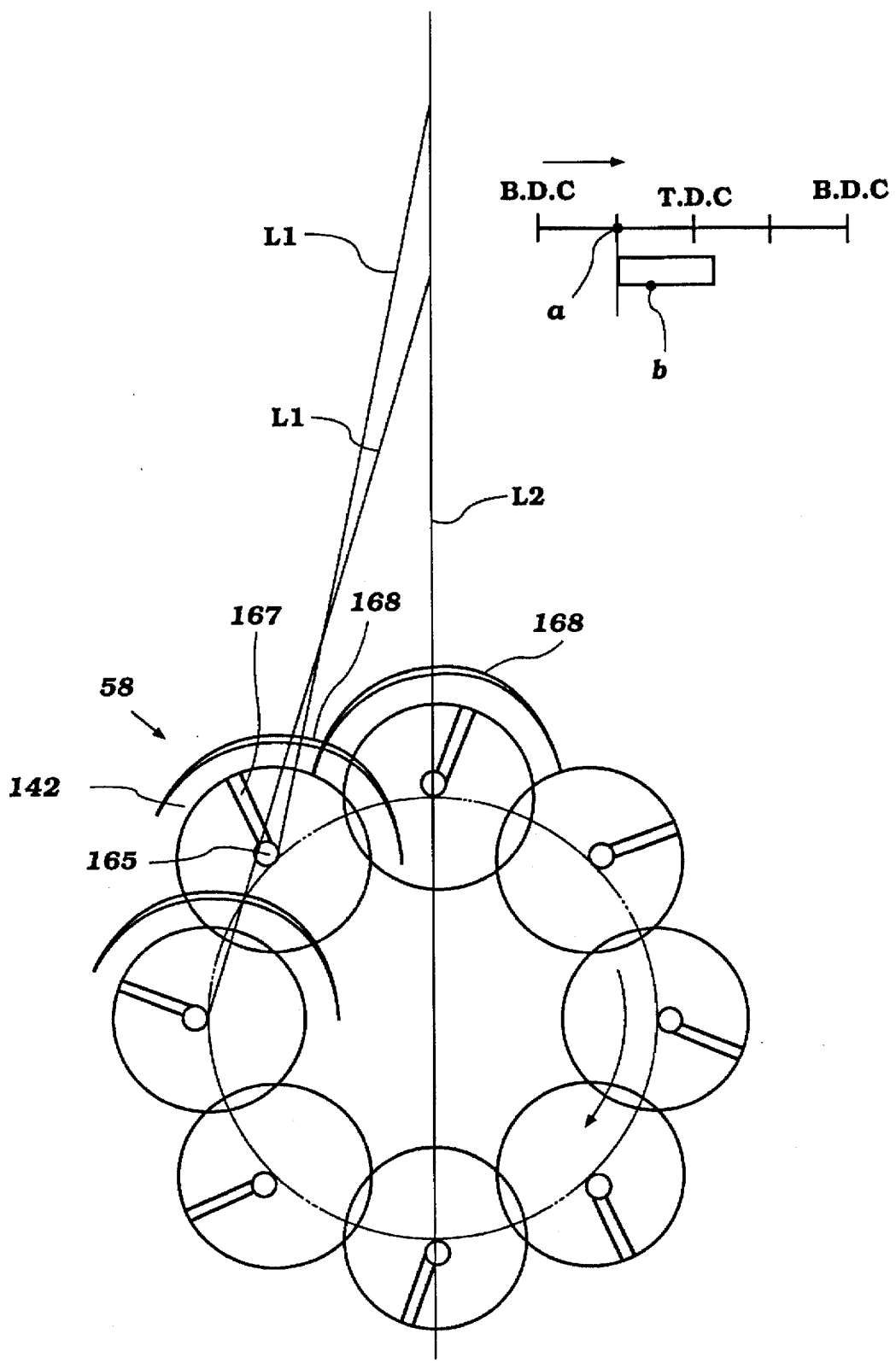
FIG. 27 is a developed view showing the relationship of the lubricant passages in this embodiment throughout a single rotation of the crankshaft.

This is accomplished by passages consisting, in this embodiment, of a single passageway 169, that is drilled through a side of the big end 75 of each connecting rod 73 in an area that may be best understood by reference to FIGS. 6, 26 and 27, although the passage also appears in other figures.

This passageway 169 extends through an outer surface 170 of the connecting rod big end 75 and is disposed at an angle $\alpha$ to a plane L1 that passes through the axis of the piston pins 74 and the axis of the throw on which the respective connecting rod 73 is journaled.

Although the delivery passage 169 is in communication with the oil receiving recess 168 at all times, oil is not delivered to this recess until the piston 71 is approximately halfway between the bottom dead-center position and the top dead-center position, as seen in FIG. 27. In this position, lubricant will flow through the crankshaft flow channel 167 into the receiving groove 168. The time of communication of the crankshaft delivery passage 167 with the oil receiving groove 168 of the connecting rod big end 75 is seen in the upper right-hand portion of FIG. 27, and occurs from this midway point between bottom dead-center and top dead-center until slightly after top dead-center. At this time, oil will be sprayed upwardly through the passage 170 onto the wall of the cylinder bore 53 and toward the piston ring 74. The air flow through the crankcase and the centrifical force will assist in this oil dispersion.

The oil spray is indicated by the arc 171 in FIG. 26, and it will be seen that the flow will also impinge on the connecting rod 73 and flow upwardly toward the piston pin 74. Preferably, the angle α is in the range of 15°–45° from the plane L1 so as to control this amount of lubricant flow.

As has been noted, the size of the various openings is useful in controlling the amount of lubricant flow and its direction. Preferably, the opening 170 in the connecting rod is sized to be approximately 140th to 150th of the cylinder bore area. This seems to provide the appropriate amount and flow of oil, although possibilities are within the scope of those skilled in the art.

Figure 28:
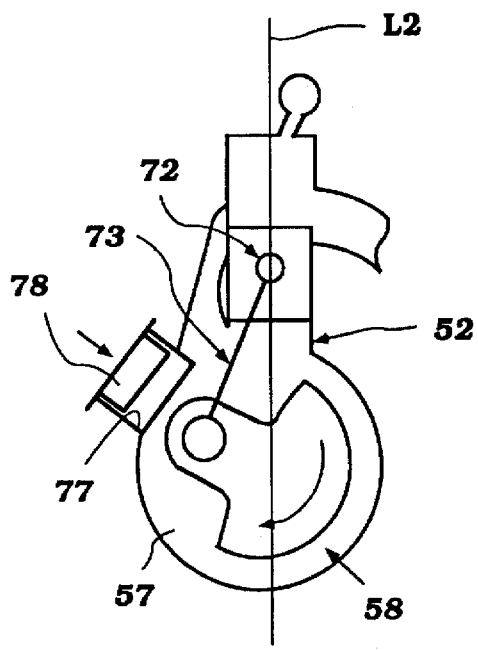
FIG. 28 is a partially schematic cross-sectional view showing the relationship of the intake port to the crankshaft of one embodiment of the invention.

Also, the position of the intake ports 77 are chosen so as to further assist in the oil distribution. The embodiment of the figures thus far described is shown schematically in FIG. 28, and it will be seen that the intake port 77 is directed so as to be in proximity to the throw of the crankshaft 58 at the time when the oil passage is opened. Therefore, the intake flow through the intake port 77 will impinge upon the oil flow from the connecting rod opening 170 and directed in an upward direction.

Figure 29:
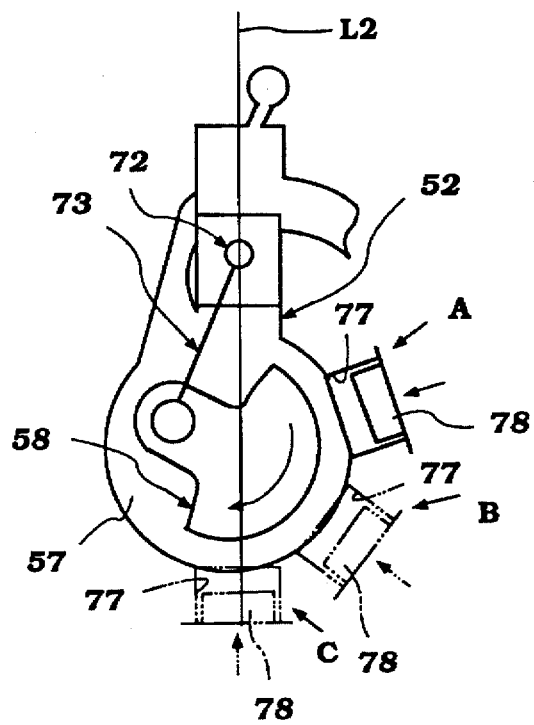
FIG. 29 is a cross-sectional view, in part similar to FIG. 28, and shows other embodiments of intake port location.

FIG. 29 shows several alternative embodiments wherein the intake port 77 is located either at the positions A, B or C on the opposite side and approaching bottom dead-center position. With these arrangements, the air flow through the intake passage is in the same direction as the crankshaft rotation, and hence, the direction of flow of the lubricant will be along with the air, and greater dispersion is possible.

In the embodiment of the figures thus far described dealing with the piston pin lubrication, the oil delivery passage 165 and 167 has been in the side of the connecting rod and spaced from the main shank portion.

Figure 30:
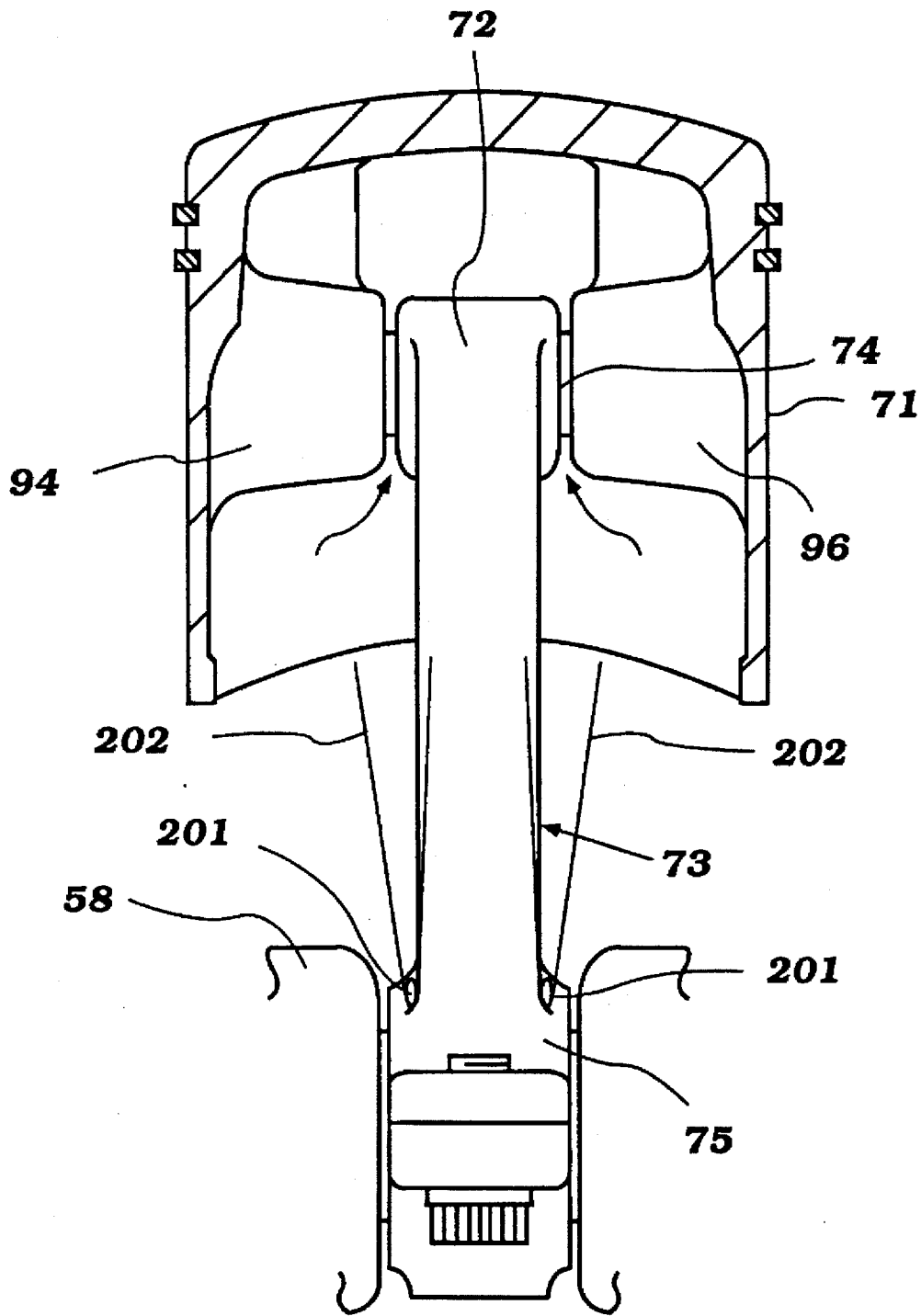
FIG. 30 is an enlarged side elevational view, in part similar to FIG. 26, and shows a further embodiment of the invention.
Figure 31:
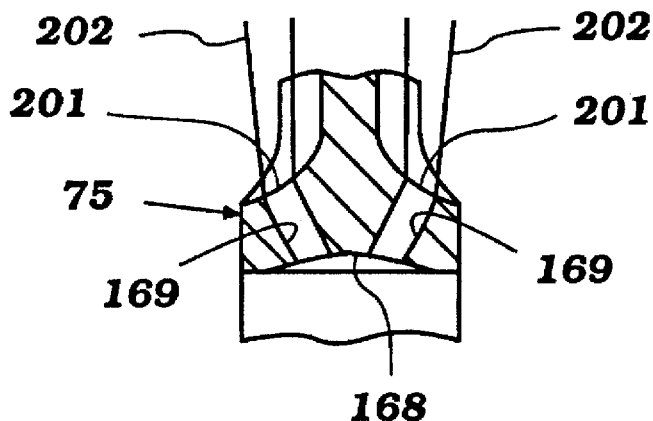
FIG. 31 is an enlarged cross-sectional view showing how the oil passages are configured in this embodiment.
Figure 32:
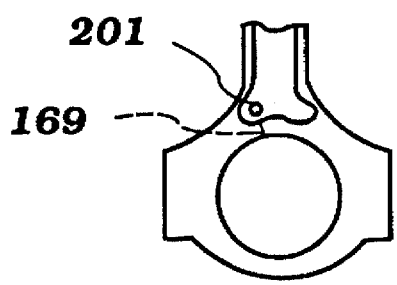
FIG. 32 is a view looking in the same direction as FIG. 27 and shows another embodiment of the invention.
Figure 33:
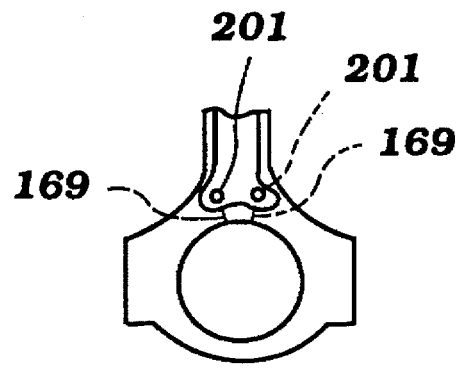
FIG. 33 is a view, in part similar to FIG. 32 and shows a still further embodiment of the invention.

FIG. 30 shows an embodiment wherein there are provided a pair of delivery passages 201 which are disposed as best seen in FIGS. 30-33. These openings 201 are disposed on opposite sides of the web portion of the connecting rod so as to provide initial spray pass 202 directed toward the piston pin bosses 94 and the ends of the piston pin 74 adjacent the spherical bearings 96. These openings may be provided one on either side of the connecting rod, as seen in FIGS. 30, 31 and 32. Alternatively, the holes may be disposed so that they are on opposite sides of the plane L1.

Thus, from the foregoing description, it should be readily apparent that the described arrangement is very effective in providing a piston pin piston connection that will minimize the stress on the components and reduce scuffing and wear. In addition, the various lubricating arrangements disclosed will ensure adequate lubrication of the piston pin and cooling of the piston.

Of course, the foregoing description is that of preferred embodiments of the invention, and various changes and modifications may be made without departing from the spirit and scope of the invention, as defined by the appended claims.

What is claimed is:

1. A piston and piston pin arrangement for a reciprocating machine comprised of a piston having a head portion and a skirt portion, a pair of spaced-apart boss portions formed in said piston on opposite sides of the cylinder axis of said head portion and defining respective piston pin receiving recesses, a piston pin having end portions received in said piston pin recesses and spanning the area between said bosses for attachment to the small end of a connecting rod, and means for providing a bearing arrangement between said piston pin recesses of said piston and the ends of said piston pin for permitting flexure without creating high wear areas on said piston pin bosses comprised of spherical recesses formed in said bosses, and spherical bearings journaled in said recesses and having bores receiving respective end portions of said piston pin.

2. The piston and piston pin arrangement as set forth in claim 1, wherein the radius of the spherical bearing outer surface is different from the radius of the spherical recess in the piston pin boss.

3. The piston and piston pin arrangement as set forth in claim 2, wherein the radius of the bearing is smaller than the radius of the spherical recess in the piston pin bosses.

4. The piston and piston pin arrangement as set forth in claim 3, wherein the piston pin receiving recess of the piston pin boss is of substantially greater diameter than the diameter of the piston pin so as to avoid any engagement between the piston pin and the piston upon pivotal movement of the spherical bearings.

5. The piston and piston pin arrangement as set forth in claim 4, wherein there is provided a slot extending axially through the piston pin bosses for passing the spherical bearings for insertion into the spherical surfaces of the piston pin bosses.

6. The piston and piston pin arrangement as set forth in claim 5, wherein the slot has a circumferential width no greater than 90° and wherein the slot axis is disposed at an angle to a plane containing the piston pin axis and the axis of the associated connecting rod.

7. The piston and piston pin arrangement as set forth in claim 4, wherein the spherical bearing is split so as to be inserted in pieces into the spherical surface of the piston pin boss.

8. The piston and piston pin arrangement as set forth in claim 1, wherein the spherical bearings are retained within the recesses by being cast in place with the piston.

9. The piston and piston pin arrangement as set forth in claim 1, in combination with a connecting rod having a small end journaled on the piston pin and a big end journaled on a throw of a crankshaft, an oil delivery passage extending through said crankshaft throw and terminating in an exterior surface of said throw, said connecting rod big end having an oil receiving groove communicating with said delivery passage for receiving oil therefrom, and a passage extending only through said connecting rod big end from said groove to a point on the outer surface of said connecting rod big end that is disposed at an acute angle to a plane containing the axis of the piston pin and for directing an oil spray directly from said big end toward said piston pin.

10. The piston and piston pin arrangement as set forth in claim 9, wherein the groove has a circumferential extent so as to be in registry with the crankshaft oil delivery passage during the portion of the stroke of said piston between bottom dead-center position and a top dead-center position so that lubricant is delivered to the delivery passage in the connecting rod only when the piston is between the top dead-center position and a piston midway to the bottom dead-center position.

11. The piston and piston pin arrangement as set forth in claim 9, wherein there are a pair of oil delivery passages extending through the connecting rod big end from the oil delivery groove each directed toward a respective end of the piston pin.

12. A lubricating arrangement for a reciprocating machine having a piston, having a pair of piston pin bosses, a piston pin journaled in said piston pin bosses, a connecting rod having a small end journaled on said piston pin between said piston pin bosses, said connecting rod having a big end journaled on a throw of a crankshaft, an oil delivery passage extending through said crankshaft and terminating in said throw, and an oil delivery passage extending through said big end from said throw to an external opening in said big end connecting rod for delivering oil from said crankshaft delivery passage and spraying in a direction toward said piston pin.

13. A lubricating arrangement for a reciprocating machine as set forth in claim 12, wherein the oil delivery passage terminates in an oil delivery groove formed in the connecting rod big end.

14. A lubricating arrangement for a reciprocating machine as set forth in arrangement as set forth in claim 13, wherein the oil delivery groove has a circumferential extent so as to be in registry with the crankshaft oil delivery passage during the portion of the stroke of the piston between a bottom dead-center and a top dead-center positions, and the top dead-center position, so that lubricant is delivered to the delivery passage in the connecting rod only when the piston is between the top dead-center position and a position midway to the bottom dead-center position.

15. A lubricating arrangement for a reciprocating machine as set forth in claim 14, wherein there are a pair of oil delivery passages extending through the connecting rod big end from the oil delivery groove each directed toward a respective end of the piston pin.

* * * * *